(12) United States Patent  (10) Patent No.: US 6,644,075 B2
Thompson  (45) Date of Patent: Nov. 11, 2003

(54) FLANGE LOCKING DEVICE

(76) Inventor: Danny B. Thompson, 7362 Murl Ellender Rd., Sulphur, LA (US) 70665

( * ) Notice: Subject to any disclaimer, the term of this patent is extended or adjusted under 35 U.S.C. 154(b) by 0 days.

(21) Appl. No.: 10/223,610

(22) Filed: Aug. 20, 2002

(65) Prior Publication Data

US 2003/0051518 A1 Mar. 20, 2003

Related U.S. Application Data

(60) Provisional application No. 60/318,825, filed on Sep. 14, 2001.

(51) Int. Cl.[7] ................................................ F16B 41/00
(52) U.S. Cl. ............................ 70/232; 70/175; 70/229; 70/DIG. 57; 403/316; 411/372.5
(58) Field of Search ......................... 70/232, 229, 230, 70/DIG. 57, 175–180, 231; 403/11, 315, 316; 411/372.5

(56) References Cited

U.S. PATENT DOCUMENTS

| 725,290 | A | | 4/1903 | Speer | |
|---|---|---|---|---|---|
| 1,473,751 | A | | 11/1923 | Walker | |
| 2,556,900 | A | * | 6/1951 | Buschhorn | 70/230 |
| 3,759,076 | A | * | 9/1973 | Reese | 70/178 |
| 4,041,738 | A | * | 8/1977 | Vann | 70/212 |
| 4,366,970 | A | | 1/1983 | Hogan, Jr. | |
| 4,541,256 | A | | 9/1985 | Green | |
| 4,571,966 | A | | 2/1986 | Lopez, Jr. | |
| 4,681,134 | A | * | 7/1987 | Paris, Sr. | 70/177 |
| 4,788,840 | A | * | 12/1988 | Wilson, Jr. | 70/164 |
| 5,312,139 | A | * | 5/1994 | Marks et al. | 285/39 |
| 5,588,316 | A | * | 12/1996 | Jones | 70/178 |
| 5,590,682 | A | * | 1/1997 | Fischer | 70/178 |
| 5,836,184 | A | * | 11/1998 | Brown | 70/178 |
| 5,950,462 | A | | 9/1999 | Neeley | |

* cited by examiner

Primary Examiner—Anthony Knight
Assistant Examiner—Christopher Boswell
(74) Attorney, Agent, or Firm—Richard C. Litman

(57) ABSTRACT

A flange junction lock has two identical approximately L-shaped parts, each with a circular nut or bolt cover mounted to a support neck forming one end portion of a shaft having a series of holes along the shaft leading to a free end, the holes being of such size as to accommodate a lock such as a padlock, and a shaft receiver attached to the support neck forming a slot to receive the shaft of the other L-shaped part. The circular covers fit over a nut and bolt head or nut on the opposite sides of the joined flanges while a lock, such as a padlock, secures the shafts together. Each cylindrical cover has a partial end cap which allows the threaded portion of a bolt to extend through and beyond the cylindrical cover while blocking insertion of a socket wrench.

5 Claims, 4 Drawing Sheets

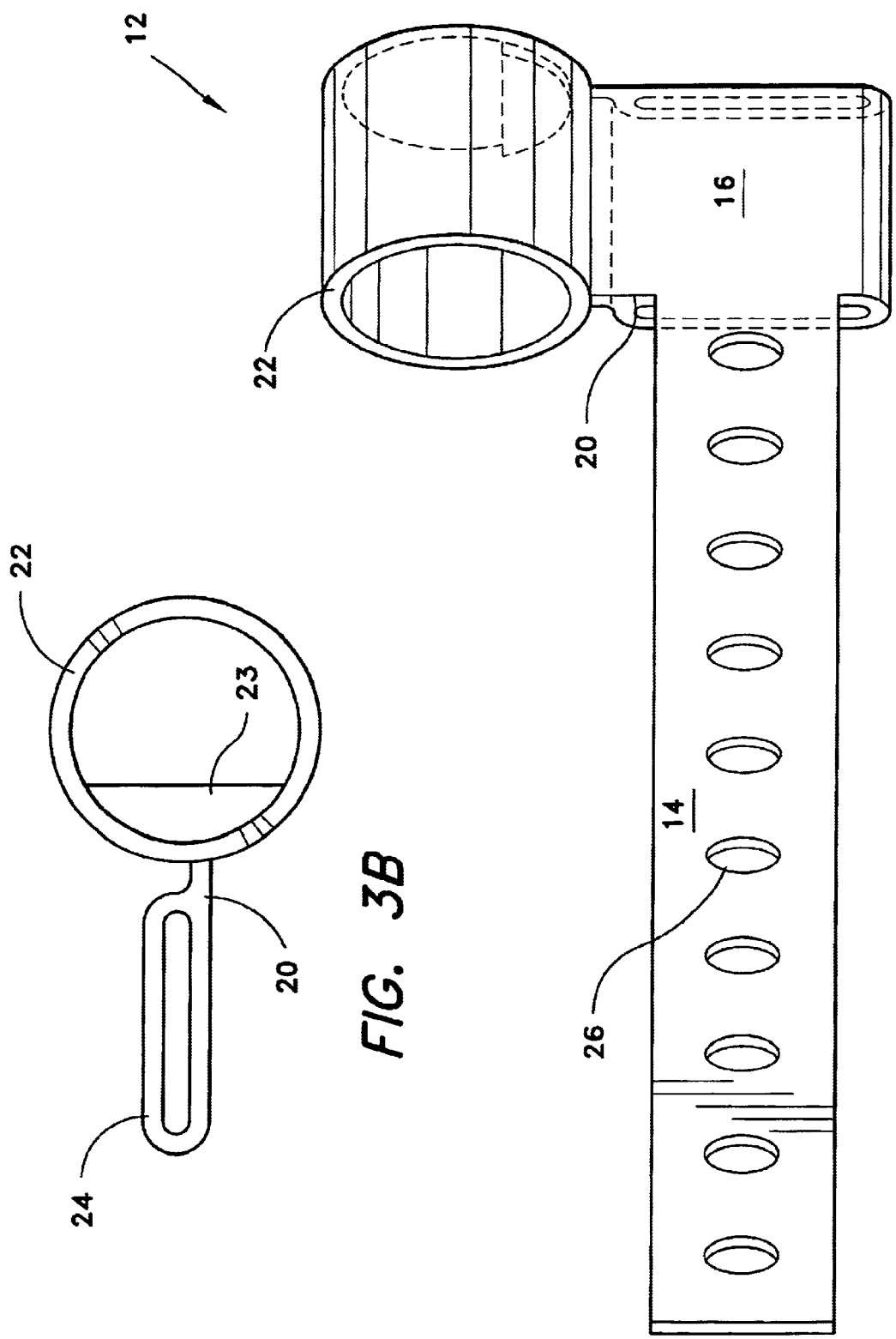

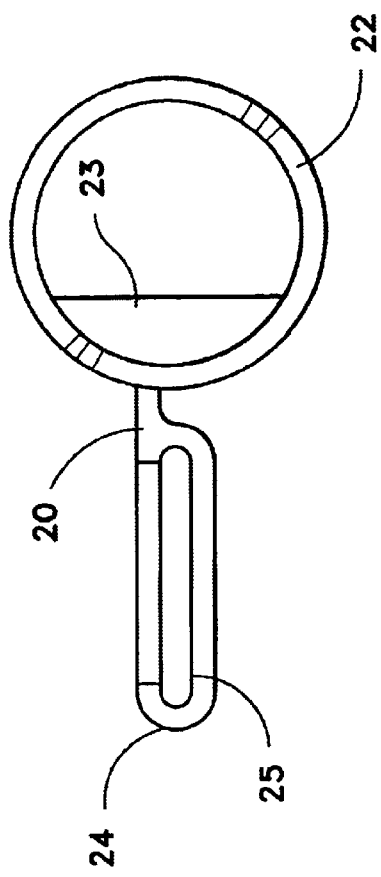
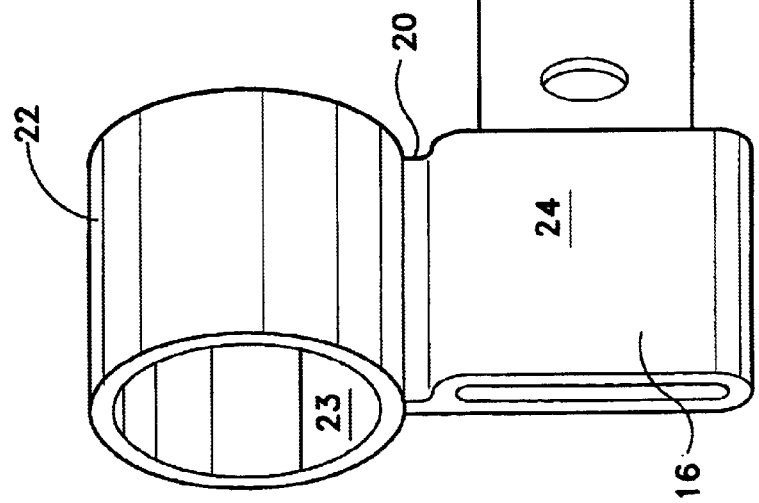
FIG. 3D
FIG. 3C

FLANGE LOCKING DEVICE

CROSS-REFERENCE TO RELATED APPLICATION

This application claims the benefit of U.S. Provisional Patent Application Serial No. 60/318,825, filed Sep. 14, 2001.

BACKGROUND OF THE INVENTION

1. Field of the Invention

The present invention relates to locking devices. More particularly, the invention is a lock for securing flange junctures such as in piping systems.

2. Description of Related Art

In industries such as the chemical industry and the oil and gas industry, it is common to join pipes to each other or to another element such as a valve or storage tank connection. This type of equipment may be quite valuable or the liquid or gas stored or transported are valuable. It is generally impractical to monitor this equipment to deter thieves or to avoid the accidental separating of the flanges. An apparatus to lock the flanges together would be desirable. The apparatus would desirably be amenable to repeated locking and unlocking, and be simple and compact in design for carrying purposes, and be rugged and reliable for outdoor use.

U.S. Pat. No. 4,366,970, issued Jan. 4, 1983, to Hogan, Jr., describes a clam shell closure which fits over the flange juncture to prevent external access to the holding bolts of the flange juncture. The '970 patent requires welding of the clam shell closure together, making a relatively permanent flange juncture, and making disassembly and reuse-difficult.

U.S. Pat. No. 1,473,751, issued Nov. 13, 1923, to Walker, describes a lock for a water meter comprising a bar with a T-shaped head that fits through slots in pairs of nuts that fit over the inlet and outlet junctions on opposite sides of the water meter. Once the bar is placed through the slots on the nuts, a lock may be placed through an aperture in the end of the bar. The lock of the '751 patent requires special nuts and their correct alignment which would be impractical for industrial use.

U.S. Pat. No. 725,290, issued Apr. 14, 1903, to Speer, describes a hinged locking device that fits over a coupling of a pipe. A lock secures the device in place. The '290 patent is a clamshell device enclosing the entire coupling and, thus, is heavy and bulky to carry and assemble, particularly for large flanges.

U.S. Pat. No. 4,571,966, issued Feb. 25, 1986, to Lopez, Jr., describes a locking mechanism that incorporates pipe flanges having locking receptacles through which extends a retaining sleeve threadedly received thereby and secured by means of a locking ring. The '966 patent requires a special flange, and, thus, it would be impractical in normal industrial use.

U.S. Pat. No. 4,541,256, issued Sep. 17, 1985, to Green, describes a flange lock for preventing unauthorized access to flange junctures such as on pipe connections. As in the '290 patent discussed above, the '256 patent is a clamshell device enclosing the entire coupling and, thus, is heavy and bulky to carry and assemble, particularly for large flanges.

U.S. Pat. No. 5,950,462, issued Sep. 14, 1999, to Neeley, describes various embodiments of devices for locking out a valve, i.e., preventing its unauthorized opening or closing. Among these devices is a scissors-like bail having aligning holes to accept a padlock. The locking device of the '462 patent would not be useful in locking flange junctures.

None of the above inventions and patents, taken either singly or in combination, is seen to describe the instant invention as claimed.

SUMMARY OF THE INVENTION

The present invention is a lock for isolating and securing a flange juncture. The flange lock has two identical approximately L-shaped parts, each with a circular nut or bolt cover mounted to a support neck forming one end portion of a shaft having a series of holes along the shaft leading to a free end, the holes being of such size as to accommodate a lock such as a padlock, and a shaft receiver attached to the support neck forming a slot to receive the shaft of the other L-shaped part. The circular covers fit over a nut and bolt on the opposite sides of the joined flanges while a lock, such as a padlock, secures the shafts together. Each cylindrical cover has a partial end cap which allows the threaded portion of a bolt to extend through and beyond the cylindrical cover while blocking insertion of the socket of a wrench in any attempt to engage the bolt head or nut for removal without unlocking the padlock.

Accordingly, it is a principal object of the invention to provide a locking device for flange junctures.

It is another object of the invention to provide a locking device as above which surrounds a flange juncture joined by a bolt head, nut, or stud and corresponding nuts threaded on the bolt.

It is a further object of the invention to provide a locking device as above which is adjustable for different thicknesses of flanges.

Still another object of the invention is to provide a locking device as above having two identical interlocking elements which slidingly engage each other.

Yet another object of the invention as above, each element having a shaft with a plurality of bores centrally located therealong so as to allow the adjustment of length by sliding said shafts relative to each other such that when the bores align a padlock may be inserted therethrough.

It is still another object of the invention to provide a flange juncture locking device that may be easily and repeatedly installed and removed from the flange juncture.

It is yet another object of the invention to provide a flange juncture locking device which is relatively light in weight, compact, and easily carried by an installer.

It is an object of the invention to provide improved elements and arrangements thereof in an apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

FIG. 3A is a front elevational perspective view of one locking arm of the device of FIG. 1.

FIG. 3B is an end view of one locking arm of the device of FIG. 1.

FIG. 3C is a rear elevational perspective view of the locking arm of FIG. 3A.

FIG. 3D is an opposite end view of the locking arm of FIG. 3B.

Similar reference characters denote corresponding features consistently throughout the attached drawings.

DETAILED DESCRIPTION OF THE PREFERRED EMBODIMENT

Figure 1:
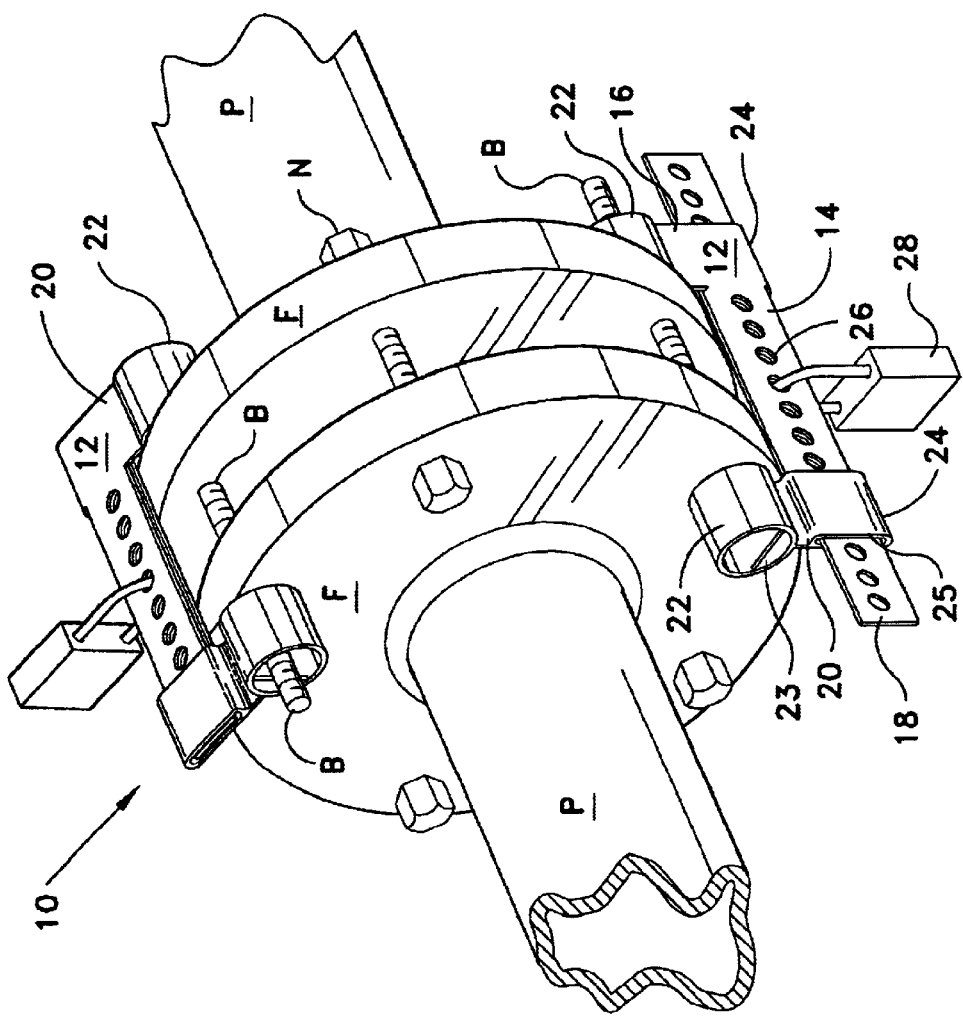
FIG. 1 is an environmental, perspective view of a flange locking device according to the present invention.
Figure 2:
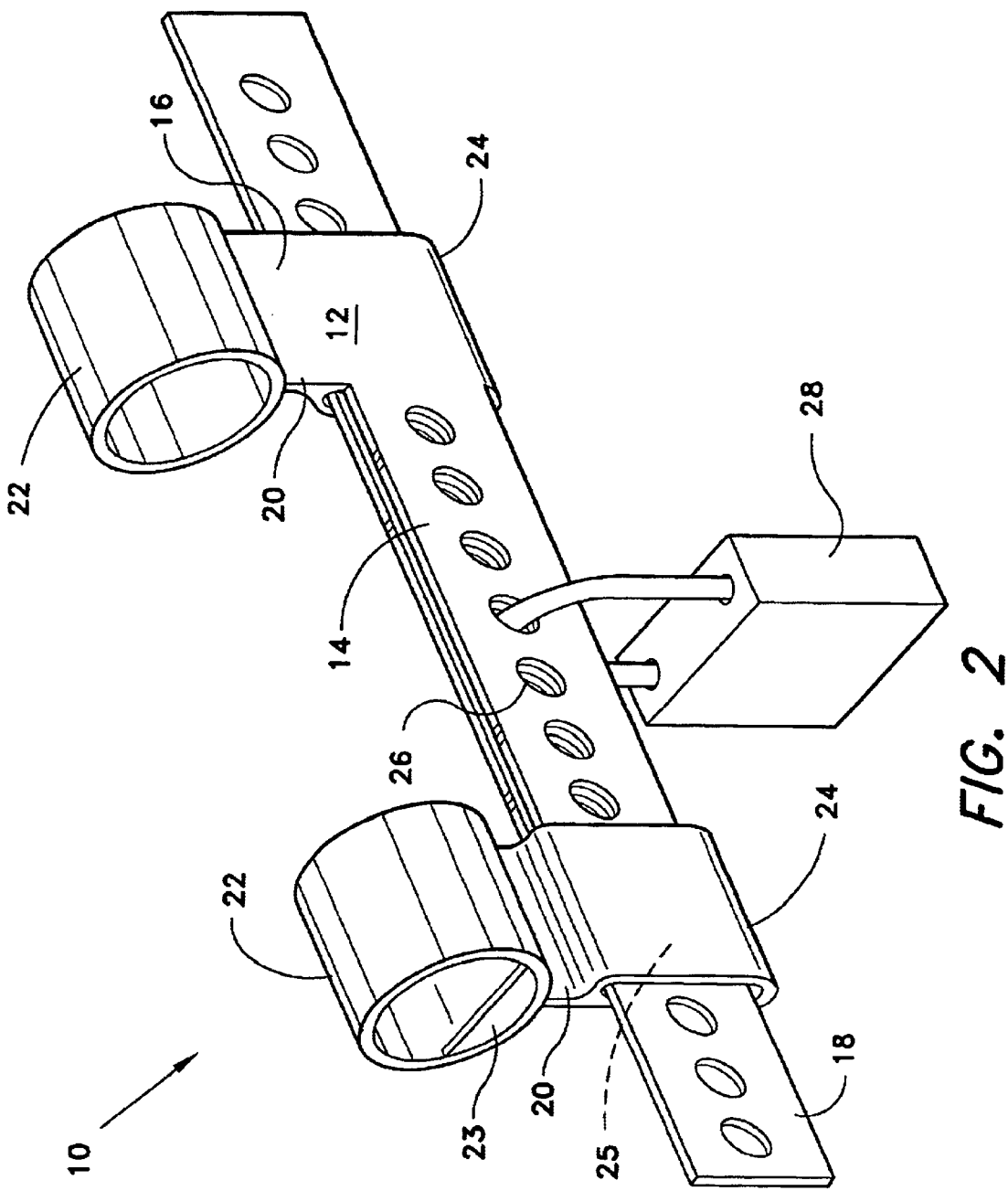
FIG. 2 is a perspective view of the locking device in a locked position as in FIG. 1.

Referring to FIGS. 1, 2, and 3A–3D there are shown the inventive locking device as mounted and locked to secure a flange juncture, the same locking device in a locked position absent the flange juncture, and front and rear perspective views and opposing end views of an individual L-shaped locking element. As illustrated in FIG. 1, various configurations of flange juncture fastener and various lengths of the inventive locking device may be employed to secure a flange juncture. The flange lock has two identical approximately L-shaped parts, each having a cylindrical nut or bolt cover on a first cylinder end portion, a shaft having a series of holes extending therealong for receiving the lock, the shaft ending in a free end portion, and a shaft receiver located at the first end portion, forming a slot to slidingly receive and surround the shaft of the other L-shaped part.

The shaft of one locking element may extend beyond the shaft receiver of the corresponding locking element as required to join a particular flange juncture. The cylindrical covers fit over a nut and bolt on the opposite sides of the joined flanges while a lock such as a padlock secures the shafts together. Each cylindrical cover has a partial end cap which allows the threaded portion of a bolt to extend through and beyond the cylindrical cover while blocking insertion of the socket of a wrench in any attempt to engage the bolt head or nut for removal without unlocking the padlock.

Referring to the figures, flange lock 10 fastens around a nut N and the head of a bolt B to lock flanges F of pipes P together and prevent access to the bolt B head or nut N. The flange lock 10 includes two identical L-shaped locking elements 12 which are reversed relative to each other and interlocked for locking purposes.

As seen most clearly in FIG. 3C, each locking element 12 has a flat shaft 14 having a cylinder end portion 16 and a free end portion 18. Cylinder end portion 16 of flat shaft 14 ends in cylinder support neck 20 which forms a first end 20 of flat shaft 14 and supports covering cylinder 22 parallel with and spaced from flat shaft 14. Cylinder support neck 20 extends such a distance as to allow the shaft 14 to clear the perimeter of the flange junction while allowing the cylindrical fastener cover 22 to surround the head of connecting bolt B or the nut N securing the bolt B. A shaft receiver 24 is attached to and extends along support neck 20 so as to form slot 25 to receive the flat shaft 14 of the complementary locking element 12. Cylindrical cover 22 includes a partial end cap 23 which allows the threaded portion of a bolt B to extend through and beyond the cylindrical cover while blocking insertion of the socket of a wrench in any attempt to engage the bolt head or nut N for removal without unlocking the padlock.

Flat shafts 14 contains bores 26 centrally located therealong such that when two locking elements 12 are interlocked, their respective bores 26 may be aligned for receiving a padlock 28. The flange lock 10 may be adjusted for length by sliding flat shafts 14 relative to each other to available lengths determined by points where at least some of the bores 26 align for receiving padlock 28.

In operation identical locking elements 12 are placed with their respective fastener covering cylinders 22 covering the head of a bolt B and its nut N joining flanges F. The locking elements 12 are interlocked and adjusted by moving a flat shaft 14 of one locking element 12 within slot 25 relative to the shaft receiver 24 of the other locking element 12 such that at least some of the bores 26 of flat shafts 14 align. The padlock 28 is then inserted through a pair of aligned bores 26 and locked, thus securing the juncture of flanges F. Removal of the lock is accomplished by unlocking padlock 28, removing it from bores 26, and then separating the two identical interlocked locking elements 12.

The inventive locking device may be installed on a flange junction with or without Isolation Blinds or Slip Blinds installed. The locking device may be used on a wide range of differing types of flanges, such as weld-neck flanges, slip-on flanges, and ring-joint flanges. Since no welding is require in the installation of the inventive lock, it can be installed on polyvinyl chloride (PVC) or other plastic flanges or fiberglass reinforced flanges. The inventive lock is useful on flanges which or bolted together such as by using bolts having bolt heads using nuts, bolts using nuts at each end, or studs using nuts. Once the flanges, bolts, or studs are tightened to the correct torque, the inventive device may then be installed without jeopardizing the integrity of the bolt-up joint.

The inventive locking device is preferably made of hardened steel, but may be constructed of any material suitable for the application intended.

It is to be understood that the present invention is not limited to the sole embodiment described above, but encompasses any and all embodiments within the scope of the following claims.

I claim:

1. A flange lock comprising:

a first generally L-shaped locking element and a second generally L-shaped locking element, each said locking element including:

a shaft having a free end portion and a cylinder end portion, said shaft defining at least one bore, and said cylinder end portion having a support neck;

a cylindrical fastener cover connected to said support neck, said fastener cover having a partial end cap, wherein said support neck is normal to said fastener cover and spaces said cover at a distance from said shaft; and a shaft receiver attached to said support neck and forming a slot for receiving the free end of a respective said shaft; and locking means for locking said first locking element to said second locking element;

whereby, said first locking element and said second locking element interlock such that the shaft of the first locking element slidingly engages the shaft receiver of the second locking element and the shaft of the second element slidingly engages the shaft receiver of the first locking element so as to align the at least one bore of each said shaft and, whereby, said cylindrical fastener cover with said partial end cap of each said locking element fits over a head of a bolt and a corresponding nut of a flange juncture to allow a threaded portion of the bolt to extend beyond the end cap of each said fastener cover to prevent access to the bolt head and the corresponding nut, while allowing the shaft of each said locking element to clear the flange juncture.

2. The flange lock according to claim 1, wherein said at least one bore of each said shaft is aligned in a locking position.

3. The flange lock according to claim 1, wherein said locking means is a padlock removably inserted through said at least one bore.

4. The flange lock according to claim 1, wherein said at least one bore includes a plurality of bores extending along each said shaft of the first and the second locking element.

5. The flange lock according to claim 1, wherein each said shaft is substantially flat.

* * * * *